US009419956B2

(12) United States Patent
Abraham et al.

(10) Patent No.: US 9,419,956 B2
(45) Date of Patent: Aug. 16, 2016

(54) SYSTEMS AND METHODS FOR AUTHENTICATING A USER FOR ACCESSING ACCOUNT INFORMATION USING A WEB-ENABLED DEVICE

(75) Inventors: Shaun J. Abraham, Charlotte, NC (US); Douglas Gerard Brown, Waxhaw, NC (US)

(73) Assignee: Bank of America Corporation, Charlotte, NC (US)

( * ) Notice: Subject to any disclaimer, the term of this patent is extended or adjusted under 35 U.S.C. 154(b) by 1253 days.

(21) Appl. No.: 12/728,919

(22) Filed: Mar. 22, 2010

(65) Prior Publication Data

US 2011/0231332 A1    Sep. 22, 2011

(51) Int. Cl.
| | | |
|---|---|---|
| H04L 9/32 | (2006.01) | |
| H04L 29/06 | (2006.01) | |
| G06F 21/34 | (2013.01) | |
| G06F 21/41 | (2013.01) | |
| G06Q 40/02 | (2012.01) | |
| G06Q 50/26 | (2012.01) | |

(52) U.S. Cl.
CPC ............... *H04L 63/08* (2013.01); *G06F 21/34* (2013.01); *G06F 21/41* (2013.01); *G06Q 40/02* (2013.01); *G06Q 50/265* (2013.01)

(58) Field of Classification Search
USPC ...................................... 705/64, 72; 713/183
See application file for complete search history.

(56) References Cited

U.S. PATENT DOCUMENTS

| | | | | |
|---|---|---|---|---|
| 2002/0112171 | A1* | 8/2002 | Ginter .................... | G06F 21/00 713/185 |
| 2002/0169961 | A1* | 11/2002 | Giles ................... | G06F 21/6218 713/175 |
| 2004/0267665 | A1* | 12/2004 | Nam ...................... | G06Q 20/04 705/41 |
| 2006/0004656 | A1 | 1/2006 | Lee | |
| 2008/0010190 | A1* | 1/2008 | Rackley, III ......... | G06Q 20/042 705/39 |
| 2008/0126250 | A1 | 5/2008 | Chen | |
| 2008/0184349 | A1 | 7/2008 | Ting | |
| 2008/0262938 | A1 | 10/2008 | Yoshinobu | |
| 2010/0100972 | A1* | 4/2010 | Lemieux ................ | G06F 21/57 726/34 |

OTHER PUBLICATIONS

International Search Report for PCT/US11/29222, dated May 20, 2011.

(Continued)

*Primary Examiner* — Tsan-Yu J Huang
(74) *Attorney, Agent, or Firm* — Michael A. Springs; Moore & Van Allen PLLC; Patrick B. Horne

(57) ABSTRACT

Systems, methods, and computer program products are provided for authenticating and efficiently re-authenticating a user with a financial institution in order to gain access to account information using a web-enabled device. The web-enabled device stores user profiles associated with the user including authentication information provided by the user during primary authentication. The device retrieves the authentication information upon secondary authentication, that is, validation of the user's identity, which in some embodiments, includes local validation of a personal identification number ("PIN") and/or a remote control passcode ("RCP"). As such, the web-enabled device re-authenticates the user without requiring authentication communication with a financial institution server, and thereafter, the user interacts with an application running on the web-enabled device to retrieve desired account information from the financial institution server.

24 Claims, 6 Drawing Sheets

(56) References Cited

OTHER PUBLICATIONS

The International Bureau of WIPO, International Preliminary Report on Patentability and Written Opinion dated Sep. 25, 2012. International Patent Application No. PCT/US2011/029222. International Filing Date: Mar. 11, 2011. Name of Applicant: Bank of America Corporation. English Language. 7 pages.

* cited by examiner

SYSTEMS AND METHODS FOR AUTHENTICATING A USER FOR ACCESSING ACCOUNT INFORMATION USING A WEB-ENABLED DEVICE

FIELD

In general, embodiments herein disclosed relate to systems, methods, and computer program products for authenticating users for access to account information and, more specifically, re-authenticating users using locally stored authentication information for granting access to account information via a web-enabled device such as a set-top box, a gaming console, a web-enabled television, a vehicle web-enabled display, or the like.

BACKGROUND

Currently, online and mobile banking provides financial institution customers the ability to access account information such as account balances, transfer information, recurring payment information and the like via personal computers or other computing devices capable of connecting with the financial institution servers over the Internet. However, customers could often use account information in situations where a conventional computing device is unavailable or does not have access to the Internet. Even in circumstances where conventional computing devices such as personal or laptop computers are available, it may be more convenient for a customer to use another device such as a web-enabled television to access account information if possible.

Furthermore, customers increasingly appreciate communication of desired information as quickly as possible. For example, a customer watching a television show who desires to know his or her checking account balance has several avenues for learning the balance including booting a laptop computer, waiting for the laptop computer to resolve a connection to the customer's wireless router for connecting to the Internet. Once the laptop has connected to the Internet, the customer must start a web browser and navigate to the financial institution's website. Thereafter, the customer must go through the authentication process, which typically requires entry of a username and a password. Some financial institutions use different systems for additional security such as a web-based authentication system, for example SiteKey® or the like, which provides additional layers of mutual authentication between the customer and the financial institution's servers as discussed in further detail below. Once the user is fully authenticated and a secure transaction portal is established providing security around communicated information, the financial institution server communicates the information desired by the customer who reads the information on the laptop. Such a process can take several minutes, and in fact, depending on various factors could take ten or fifteen minutes. A system requiring such a waiting period fails to satisfy a customer needing immediate communication of account information.

Therefore, a need exists to develop methods, systems, computer program products and the like which provide for re-authentication of a user using common web-enabled devices such as web-enabled televisions, set-top boxes, gaming consoles and the like based on locally stored user profiles.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate from the scope of any or all embodiments. Its sole purpose is to present some concepts of one or more embodiments in a simplified form as a prelude to the more detailed description that is presented later.

Systems, methods, and computer program products are provided for authenticating and efficiently re-authenticating a user with a financial institution in order to gain access to account information using a web-enabled device.

According to one embodiment of the present invention, a method provides efficient authentication of a user desiring access to account information maintained by a financial institution. The method includes connecting a web-enabled device to a financial institution server; communicating, from the web-enabled device, user authentication information to the financial institution server; receiving, at the web-enabled device, validation of primary authentication from the financial institution server; storing, at the web-enabled device, the authentication information in one or more user profiles associated with the user; retrieving the authentication information from the one or more user profiles when the user desires access to the account information; verifying the identity of the user thereby establishing secondary authentication; and conducting one or more account information transactions. In some embodiments, the method includes creating an initial personal identification number (PIN) associated with the user and storing the authentication information in the one or more user profiles comprises storing the initial PIN in the one or more user profiles; retrieving the authentication information comprises retrieving the initial PIN; and verifying the identity of the user comprises receiving current PIN input from the user and verifying the current PIN input matches the initial PIN retrieved from the one or more user profiles.

In some embodiments, the method includes receiving an initial personal identification number (PIN) from the user and storing the authentication information in the one or more user profiles comprises storing the initial PIN in the one or more user profiles; retrieving the authentication information comprises retrieving the initial PIN; and verifying the identity of the user comprises receiving current PIN input from the user and verifying the current PIN input matches the initial PIN retrieved from the one or more user profiles. In some embodiments, the method includes communicating validation of the secondary authentication to the financial institution server.

In some embodiments the method includes determining whether a predetermined period of time has lapsed since primary authentication; and communicating that the predetermined period of time has elapsed to the user. In some embodiments, the method further includes re-connecting the web-enabled device to the financial institution server; re-communicating, from the web-enabled device, user authentication information to the financial institution server; receiving, at the web-enabled device, re-validation of primary authentication from the financial institution server; re-storing, at the web-enabled device, the authentication information in one or more user profiles associated with the user; and conducting one or more account information transactions.

In some embodiments, the step of verifying the identity of the user includes receiving, from a mobile device, identity information identifying the user to the web-enabled device; and validating the identity information thereby establishing secondary authentication. In some embodiments, the identity information includes one or more of the name of the user, a username, mobile device identifier, a current personal identification number, and a current remote control passcode.

According to another embodiment of the present invention, a system provides efficient authentication of a user desiring access to account information maintained by a financial institution. The system includes a web-enabled device configured for connecting to a financial institution server and having a processor connected to a memory and a communications module. The communications module is configured for communicating user authentication information to the financial institution server and receiving validation of primary authentication from the financial institution server. The memory is configured for storing the authentication information in one or more user profiles associated with the user, and the processor is configured for retrieving, from the memory, the authentication information in the one or more user profiles when the user desires access to the account information; verifying the identity of the user thereby establishing secondary authentication; and facilitating one or more account information transactions between the user and the financial institution server.

In some embodiments of the system, the web-enabled device processor is further configured for creating an initial personal identification number (PIN) associated with the user; storing the initial PIN in the one or more user profiles; retrieving the initial PIN; receiving current PIN input from the user; and verifying the current PIN input matches the initial PIN retrieved from the one or more user profiles.

In some embodiments of the system, the web-enabled device communications module is further configured for receiving an initial personal identification number (PIN) from the user; and the web-enabled device processor is further configured for storing the initial PIN in the one or more user profiles; retrieving the initial PIN; receiving current PIN input from the user; and verifying the current PIN input matches the initial PIN retrieved from the one or more user profiles. In some embodiments, the web-enabled device communications module is further configured for communicating validation of the secondary authentication to the financial institution server.

In some embodiments of the system, the web-enabled device processor is further configured for determining whether a predetermined period of time has lapsed since primary authentication; and in some embodiments the system further comprises a display connected to the web-enabled device and configured for communicating that the predetermined period of time has lapsed to the user.

In some embodiments of the system, the web-enabled device is further configured for re-connecting to the financial institution server, and the web-enabled device communications module is further configured for re-communicating user authentication information to the financial institution server and receiving re-validation of primary authentication from the financial institution server. In some embodiments, the web-enabled device memory is further configured for re-storing the authentication information in one or more user profiles associated with the user; and the web-enabled device processor is further configured for facilitating one or more account information transactions between the user and the financial institution server.

In some embodiments of the system, the web-enabled device is one or more of a set-top box, a gaming console, a web-enabled television, and a vehicle web-enabled display. In some embodiments of the system, the web-enabled device communications module is further configured for receiving, from a mobile device, identity information identifying the user to the web-enabled device, and the web-enabled device processor is further configured for validating the identity information thereby establishing secondary authentication.

In some embodiments, the identity information includes one or more of a name of the user, a username, a mobile device identifier, a current personal identification number, and a current remote control passcode.

According to another embodiment of the present invention, a computer program product includes a non-transitory computer-readable medium, including computer-readable instructions configured for providing efficient authentication of a user desiring access to account information maintained by a financial institution. The instructions include instructions for connecting a web-enabled device to a financial institution server; instructions for communicating, from the web-enabled device, user authentication information to the financial institution server; instructions for receiving, at the web-enabled device, validation of primary authentication from the financial institution server; instructions for storing, at the web-enabled device, the authentication information in one or more user profiles associated with the user; instructions for retrieving the authentication information from the one or more user profiles when the user desires access to the account information; instructions for verifying the identity of the user thereby establishing secondary authentication; and instructions for conducting one or more account information transactions.

In some embodiments of the computer program product, the instructions include instructions for creating an initial personal identification number (PIN) associated with the user and the instructions for storing the authentication information in the one or more user profiles include storing the initial PIN in the one or more user profiles; the instructions for retrieving the authentication information include retrieving the initial PIN; and the instructions for verifying the identity of the user include receiving current PIN input from the user and verifying the current PIN input matches the initial PIN retrieved from the one or more user profiles.

In some embodiments of the computer program product, the instructions further include instructions for receiving an initial personal identification number (PIN) from the user and wherein the instructions for storing the authentication information in the one or more user profiles include storing the initial PIN in the one or more user profiles; the instructions for retrieving the authentication information include retrieving the initial PIN; and the instructions for verifying the identity of the user include receiving current PIN input from the user and verifying the current PIN input matches the initial PIN retrieved from the one or more user profiles.

In some embodiments of the computer program product, the instructions include instructions for communicating validation of the secondary authentication to the financial institution server. In some embodiments, the instructions further include instructions for communicating validation of the secondary authentication to the financial institution server. In some embodiments, the instructions further include instructions for determining whether a predetermined period of time has lapsed since primary authentication and instructions for communicating that the predetermined period of time has elapsed to the user.

In some embodiments of the computer program product, the instructions further include instructions for re-connecting the web-enabled device to the financial institution server; instructions for re-communicating, from the web-enabled device, user authentication information to the financial institution server; instructions for receiving, at the web-enabled device, re-validation of primary authentication from the financial institution server; instructions for re-storing, at the web-enabled device, the authentication information in one or more user profiles associated with the user; and instructions for conducting one or more account information transactions. In some embodiments, the instructions further include instructions for receiving, from a mobile device, identity information identifying the user to the web-enabled device and instructions for validating the identity information thereby establishing secondary authentication. In some embodiments, the identity information includes one or more of the name of the user, a username, mobile device identifier, a current personal identification number, and a current remote control passcode.

According to another embodiment of the present invention, a system provides efficient authentication of a user desiring access to account information maintained by a financial institution. The system includes means for connecting to a financial institution server; means for communicating user authentication information to the financial institution server; means for receiving validation of primary authentication; means for storing the authentication information in one or more user profiles associated with the user; means for retrieving the authentication information from the one or more user profiles when the user desires access to the account information; means for verifying the identity of the user thereby establishing secondary authentication; and means for conducting one or more account information transactions.

According to another embodiment of the present invention, a method provides efficient authentication of a user desiring access to account information maintained by a financial institution. The method includes retrieving authentication information including verification of previously validated primary authentication from one or more user profiles stored on a web-enabled device when the user desires access to the account information; verifying, at the web-enabled device, the identity of the user thereby establishing secondary authentication; connecting the web-enabled device to a financial institution server; and conducting, using the web-enabled device, one or more account information transactions with the financial institution server.

Some embodiments of the method include creating an initial personal identification number (PIN) associated with the user; storing the initial PIN in the one or more user profiles; retrieving the initial PIN from the one or more user profiles; and verifying the identity of the user includes receiving current PIN input from the user and verifying the current PIN input matches the initial PIN retrieved from the one or more user profiles.

Some embodiments of the method further include receiving an initial personal identification number (PIN) associated with the user; storing the initial PIN in the one or more user profiles; retrieving the initial PIN from the one or more user profiles; and verifying the identity of the user includes receiving current PIN input from the user and verifying the current PIN input matches the initial PIN retrieved from the one or more user profiles. Some embodiments of the method further include communicating validation of the secondary authentication to the financial institution server. Yet other embodiments of the method include determining whether a predetermined period of time has lapsed since primary authentication and communicating that the predetermined period of time has elapsed to the user.

Other embodiments of the method include re-connecting the web-enabled device to the financial institution server; communicating, from the web-enabled device, user authentication information to the financial institution server; receiving, at the web-enabled device, validation of primary authentication from the financial institution server; storing, at the web-enabled device, the authentication information in one or more user profiles associated with the user; and conducting one or more account information transactions. In some embodiments, verifying the identity of the user includes receiving, from a mobile device, identity information identifying the user to the web-enabled device and validating the identity information thereby establishing secondary authentication.

In some embodiments of the method, the identity information includes one or more of the name of the user, a username, mobile device identifier, a current personal identification number, and a current remote control passcode.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
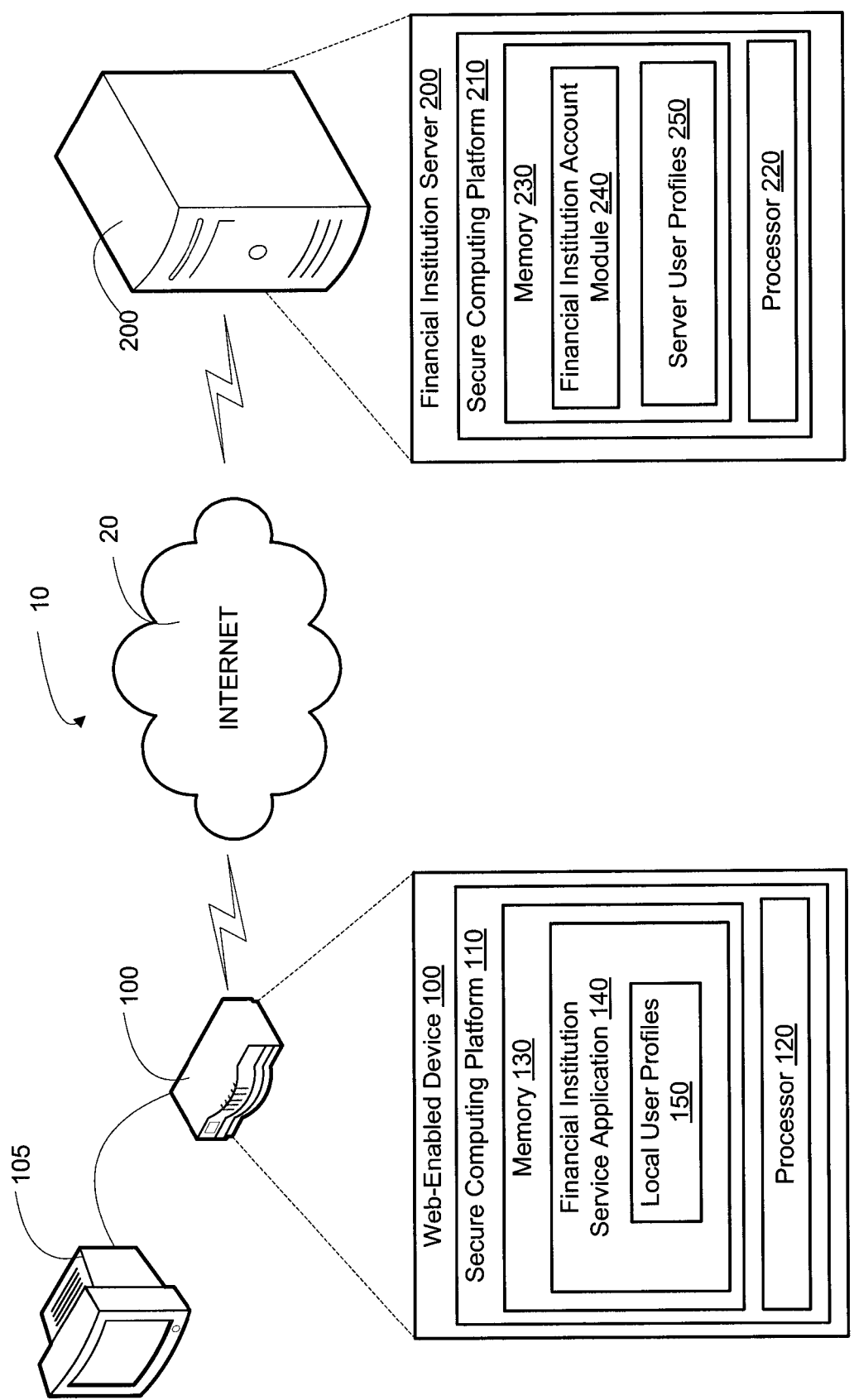

Having thus described embodiments of the invention in general terms, reference will now be made to the accompanying drawings, which are not necessarily drawn to scale, and wherein:

FIG. 1 is a block diagram of a system for providing primary authentication for users desiring access to account information using a web-enabled device according to one embodiment of the present invention.

Figure 2:
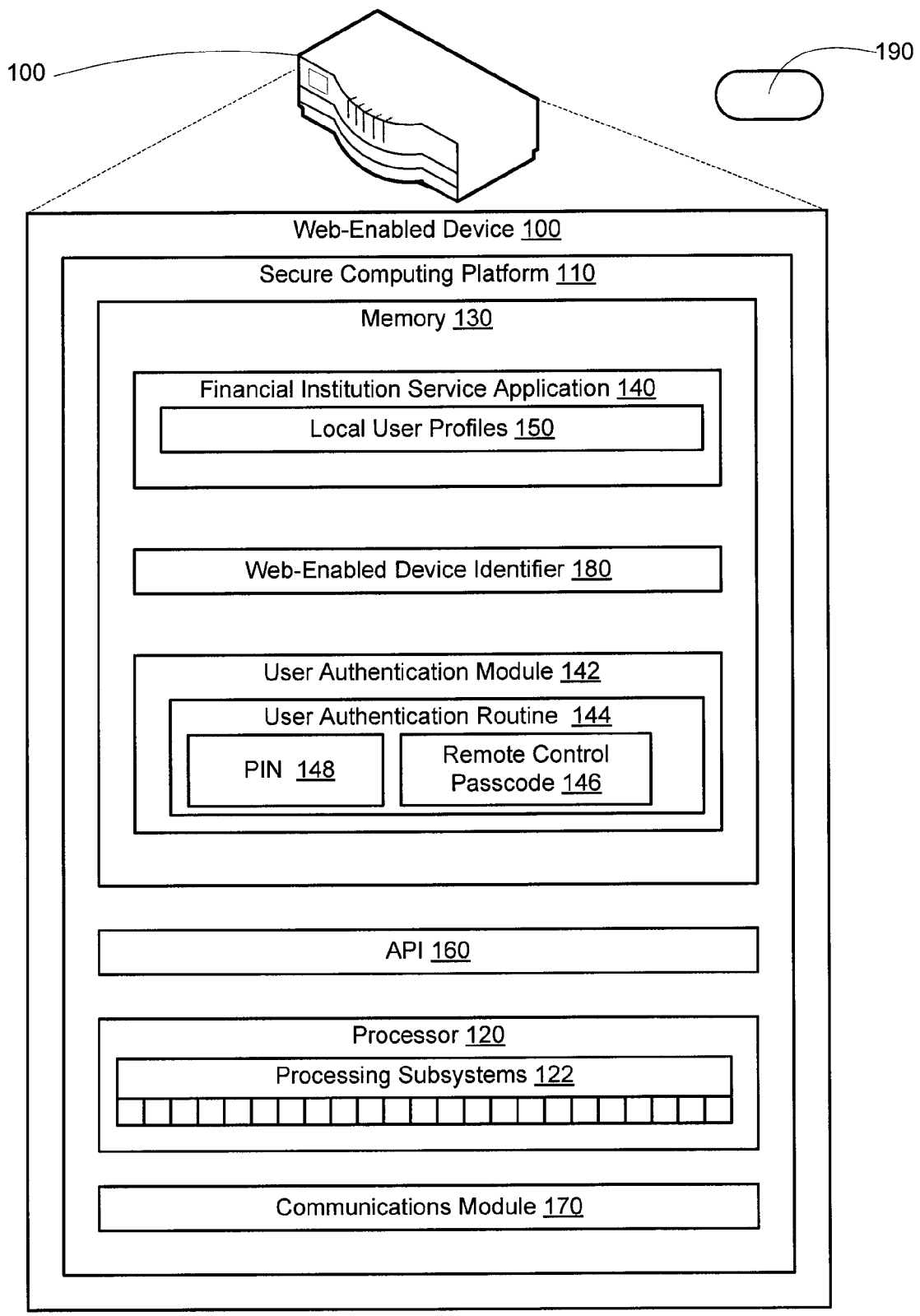

FIG. 2 is a block diagram of a web-enabled device including additional detail according to one embodiment of the present invention.

Figure 3:
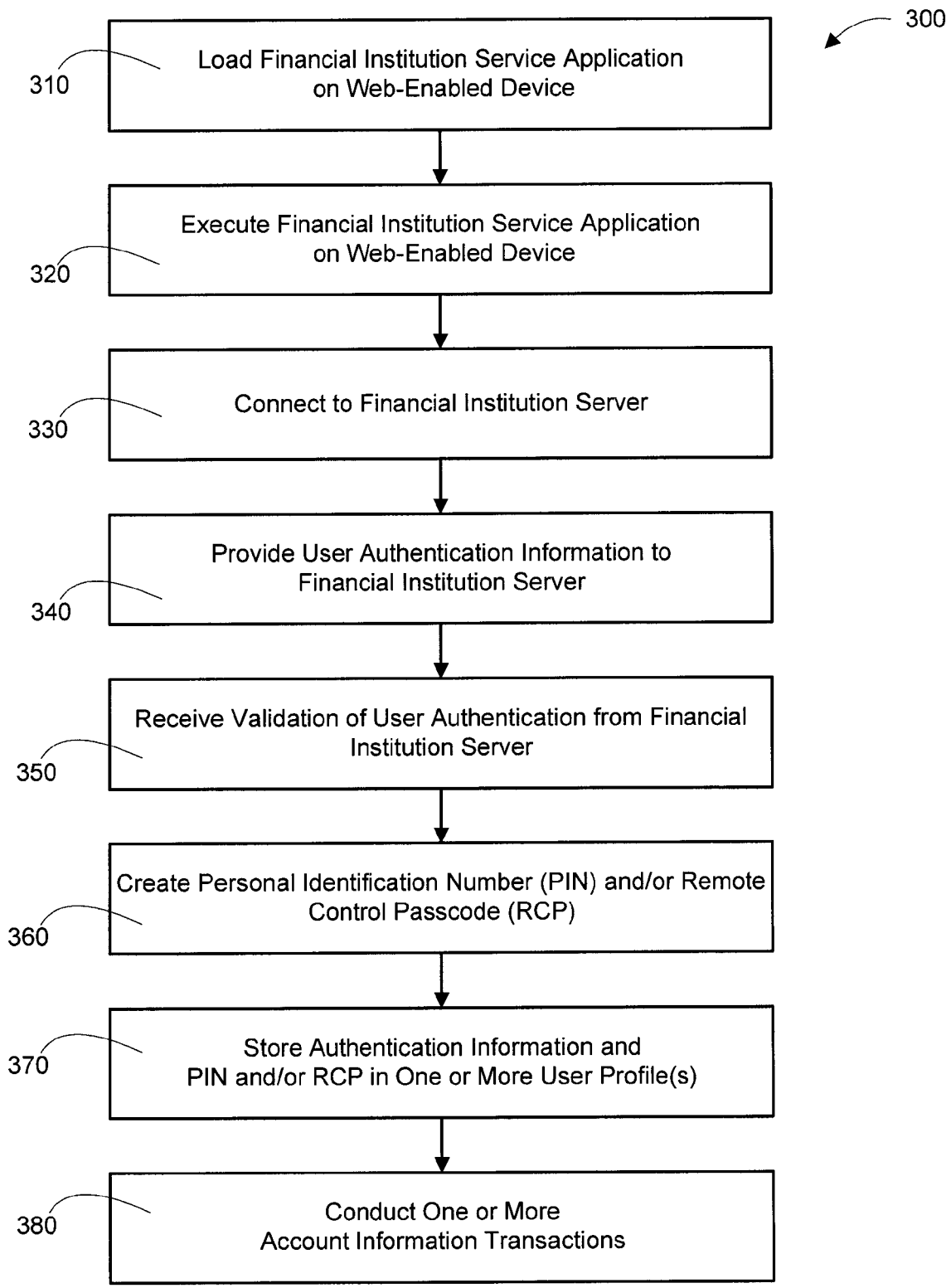

FIG. 3 is a flow chart illustrating a method for authenticating a customer with a financial institution server and communicating the account information to the customer using a web-enabled device according to one embodiment of the present invention.

Figure 4:
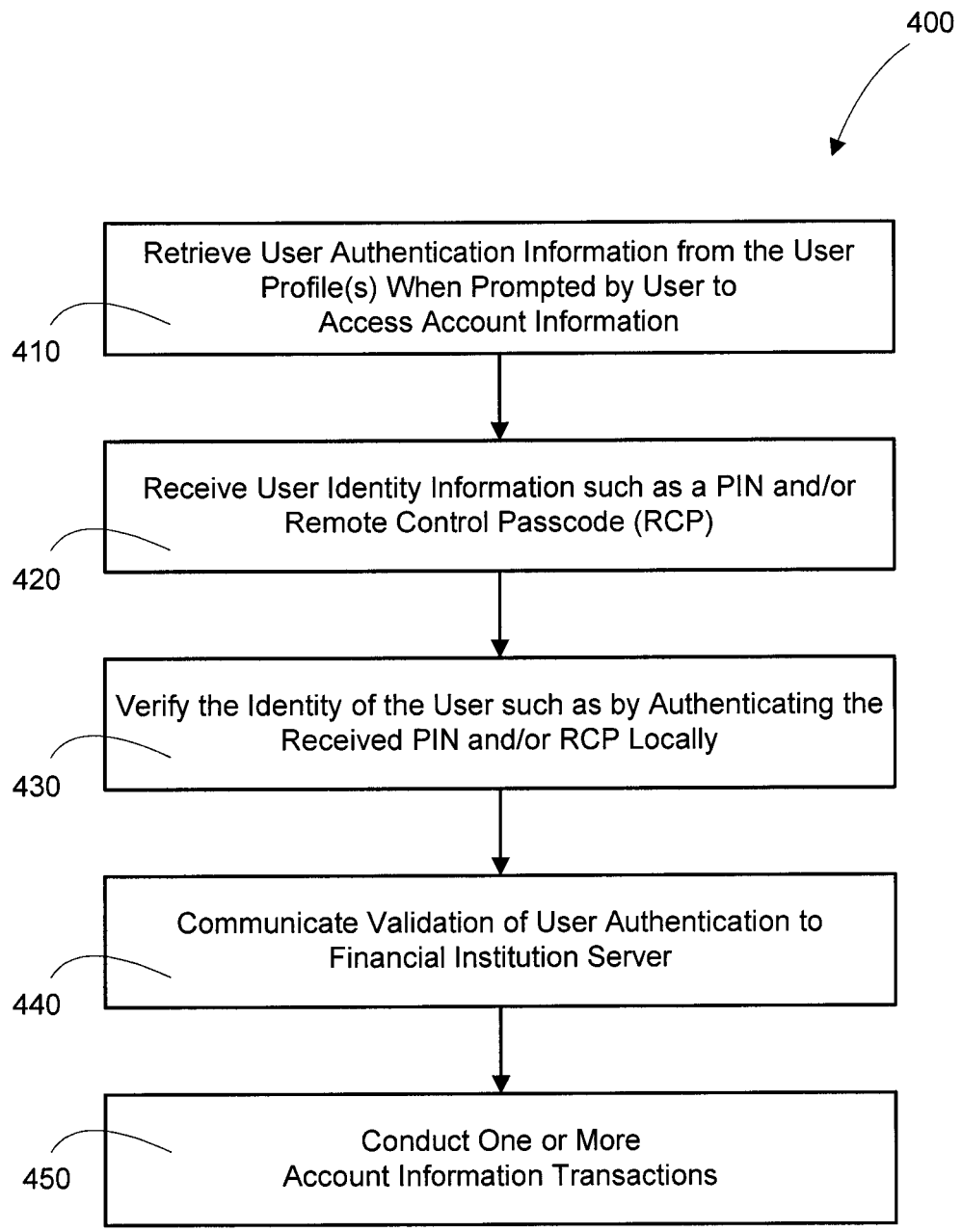

FIG. 4 is a flow chart illustrating a method for providing secondary authentication for the user using retained authentication information stored in one or more user profiles according to one embodiment of the present invention.

Figure 5:
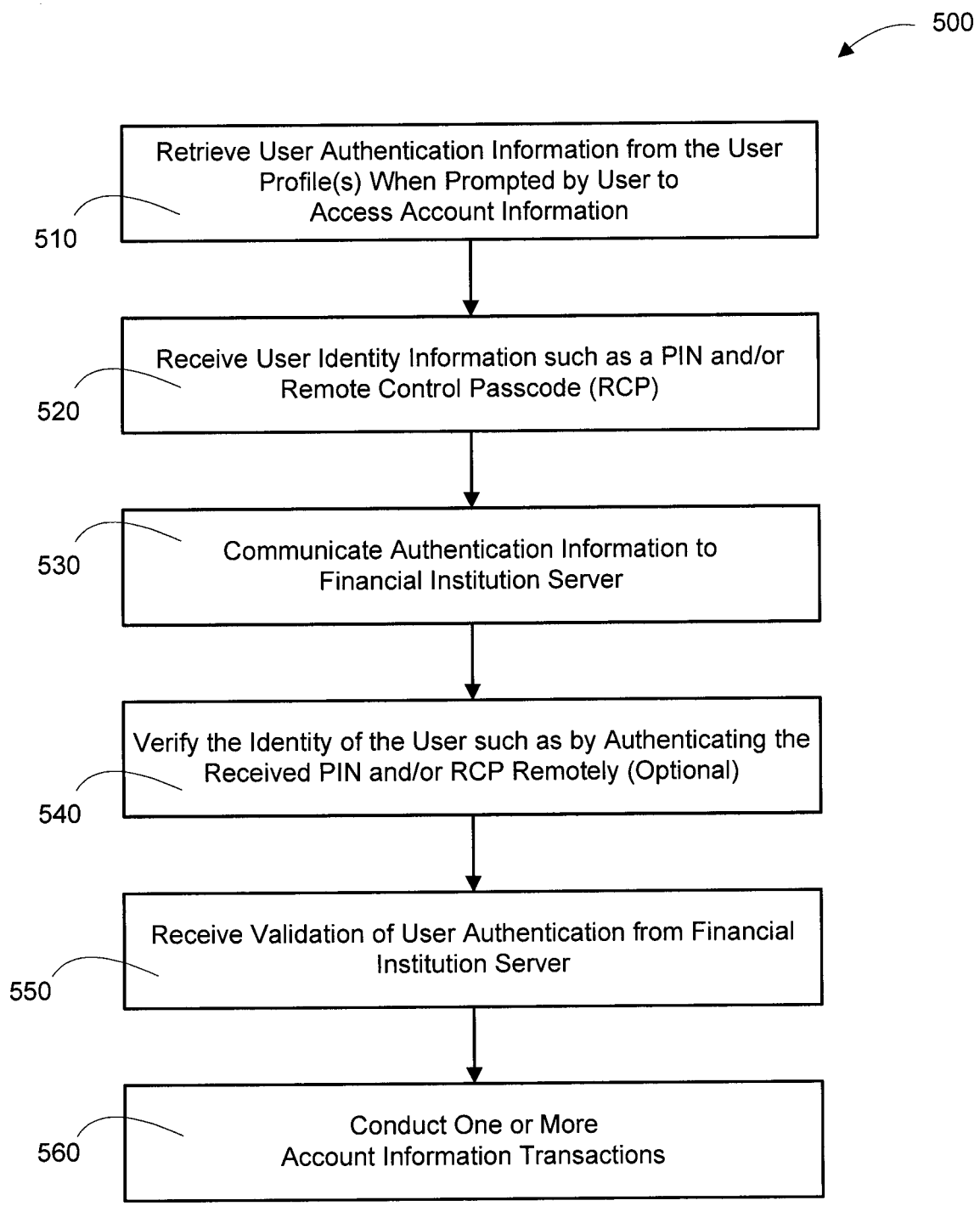

FIG. 5 is a flow chart illustrating another method for providing secondary authentication for the user using retained authentication information stored in one or more user profiles according to another embodiment of the present invention.

Figure 6:
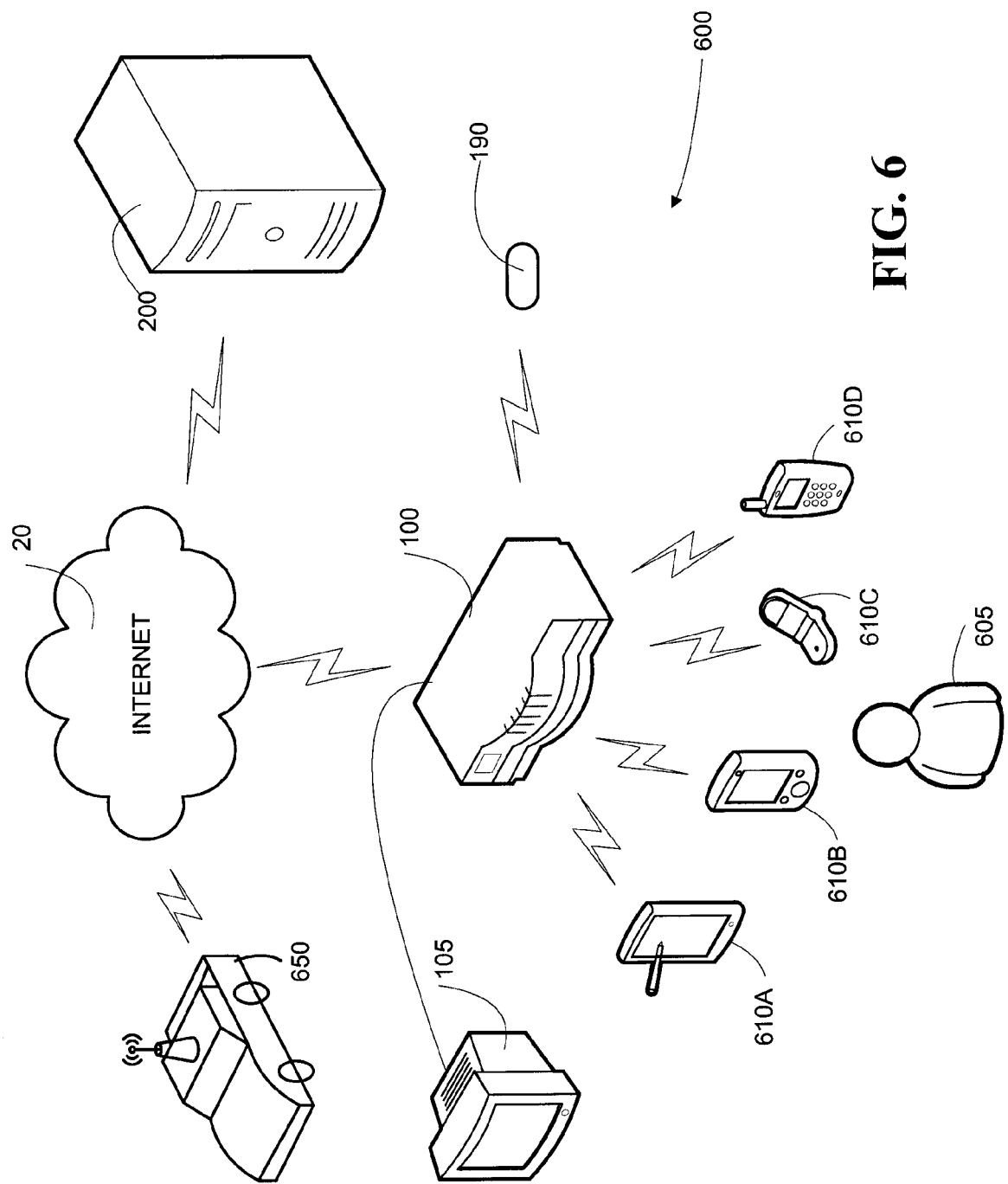

FIG. 6 is a block diagram illustrating the various alternate embodiments of the system in accordance with the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident, however, that such embodiment(s) may be practiced without these specific details. Like numbers refer to like elements throughout.

Systems, methods, and computer program products are provided for authenticating and efficiently re-authenticating a user with a financial institution in order to gain access to account information using a web-enabled device. The web-enabled device stores user profiles associated with the user including authentication information provided by the user during primary authentication. The device retrieves the authentication information upon secondary authentication, that is, validation of the user's identity, which in some embodiments, includes local validation of a personal identification number ("PIN") and/or a remote control passcode ("RCP"). As such, the web-enabled device re-authenticates the user without requiring authentication communication with a financial institution server, and thereafter, the user interacts with an application running on the web-enabled device to retrieve desired account information from the financial institution server.

Referring now to FIG. 1, a block diagram depicts a system 10 for authenticating customers for access to account information using a web-enabled device 100. The system 10 includes a financial institution server 200 in network communication with the web-enabled device 100. Examples of web-enabled devices 100 include, but are not limited to, web-enabled televisions, web-enabled set-top boxes and web-enabled gaming consoles connected with one or more displays 105, web-enabled vehicle displays (see FIG. 6), laptop computers, mobile computing devices, and the like. Examples of set-top boxes include, but are not limited to, cable boxes, including digital, HD and other cable boxes, digital video recorder (DVR) boxes, satellite boxes, a Slingbox®, manufactured by Sling Media, Inc. of Foster City, Calif., and the like. Examples of gaming consoles include, but are not limited to the following: Playstation®, PlayStation Portable (PSP®) manufactured by Sony Corporation of Tokyo, Japan; Xbox® and Xbox 360® manufactured by Microsoft Corporation of Redmond, Wash., USA; and Wii®, GameBoy® and Nintendo DS™ manufactured by Nintendo Company Ltd. of Kyoto, Japan. Examples of displays 105 include, but are not limited to, televisions such as tube SD televisions, DLP HD televisions, LCD HD televisions, plasma HD televisions, and the like and monitors such as CRT monitors, LCD monitors, and the like.

As illustrated in FIG. 1, the web-enabled device 100 and the financial institution server 200 are in network communication via the Internet 20, although other public and/or private intranets may also be implemented in accordance with other embodiments of the present invention. The web-enabled device 100 includes secure computing platform 110 having a processor 120 and a memory 130. As previously noted, the secure nature of computing platform 110 dictates that the information communicated from the web-enabled device, specifically authentication information communicated from the web-enabled device 100 to the financial institution server 200 and account information communicated from the financial institution server 200 to the web-enabled device 100 is secure.

Further, the memory 130 of secure computing platform 110 includes financial institution service application 140. The financial institution service application 140 is operable for establishing a secure connection with the financial institution server 200 to deliver account information to the user of the web-enabled device 100. In various embodiments, account information includes, but is not limited to, account current and available balances, transaction information such as information regarding pending transactions and scheduled future transactions, information concerning posted transactions such as date, transaction type, check number if applicable, description of transaction, and debit or credit amount, customer information such as contact address, phone and e-mail and other information related to the customer's one or more accounts maintained by the financial institution. In addition, from a business perspective, the web-enabled device 100 may be in communication with a digital cash drawer, card/UPC scanner, or the like (which are not depicted in FIG. 1) and, thus, the web-enabled device 100 may function as a point-of-sale device. The financial institution service application 140 includes code and is specifically configured for the web-enabled device 100 on which it is implemented. Financial institution service application 140 includes one or more locally stored user profiles 150. The local user profiles 150 are collections of information corresponding to one or more customers who use the web-enabled device 100. Each profile stores identification and authentication information for assisting one or more customers in authenticating with the financial institution server 200 as discussed in further detail below. In some embodiments, the customer submits authentication information, such as a username, password, and in some embodiments, a chosen image and accompanying phrase, used for authenticating the customer with the financial institution server 200. Once the customer has been authenticated with the financial institution server 200, the web-enabled device 100 stores the customer's positive authentication for a predetermined period of time, for example one week or one month. In some embodiments, the web-enabled device 100 establishes a PIN for the customer to enter the next time the customer requires access to account information. The web-enabled device 100 simply requests the username and PIN the next time the customer desires account information. In this regard, in some embodiments, when the customer requires authentication subsequent to being authenticated a first time, the authentication is performed locally to the web-enabled device 100. This secondary authentication typically does not go through a more complicated process including secure communication with the financial institution server 200.

In the illustrated embodiment, the financial institution server 200 also includes a secure computing platform 210 having a processor 220 and memory 230. Memory 230 includes a financial institution account module 240 operable for providing a secure connection to the web-enabled device 100 and delivering account information to the web-enabled device 100. Memory 230 also includes server user profiles 250 that include collections of information corresponding to one or more customers having accounts maintained by the financial institution. In some embodiments, the server user profiles 250 are established the financial institution during or concurrently with establishing a user's account, and in other embodiments, the server user profiles 250 are established later. In some embodiments, the server user profiles 250 include some or all of the information contained in one or more corresponding local user profiles 150. And in yet other embodiments, the server user profiles 250 are updated or changed concurrently or soon after changes are made to the corresponding local user profiles 150, and in other embodiments, the server user profiles 250 are not updated based on changes to the local user profiles 150 or are changed some time after changes are made to the local user profiles 150. The server user profiles 250, in some embodiments, were populated with information before the local user profiles 150 and are used as a basis for populating the local user profiles 150 with information.

Referring now to FIG. 2, a block diagram illustrating a more detailed depiction of one embodiment of the web-enabled device 100 is shown. In addition to providing greater detail, FIG. 2 highlights various alternate embodiments of the present invention. The web-enabled device 100 includes, in various embodiments different types of computerized communication devices capable of providing a platform for the financial institution service application 140 and establishing a secure network connection with the financial institution server 200 on behalf of the financial institution service application 140.

The web-enabled device 100 includes a secure computing platform 110 configured for transmitting data across a wired and/or wireless network and receiving and executing routines and applications. Secure computing platform 110 includes memory 130, which includes, but is not limited to, in various embodiments, one or more of the following: volatile and non-volatile memory such as read-only and/or random-access memory (RAM and ROM), EPROM, EEPROM, flash cards, or any memory common to computer platforms. Further, memory 130 includes, in various embodiments one or more flash memory cells, or, in other embodiments includes a secondary or tertiary storage device, such as magnetic media, optical media, tape, or soft or hard disk.

Further, secure computing platform 110 also includes processor 120, which, in some embodiments, is an application-specific integrated circuit ("ASIC"), or other chipset, processor, logic circuit, or other data processing device. Processor 120 or another processor, such as an ASIC, may execute an application programming interface ("API") layer 160 that interfaces with any resident programs, such as financial institution service application 140 stored in the memory 130 of the web-enabled device 100. API 160 is typically a runtime environment executing on the web-based device 100 and operable to control the execution of applications on the web-enabled device 100.

Processor 120 includes various processing subsystems 122 embodied in hardware, firmware, software, and combinations thereof, that enable the functionality of web-enabled device 100 and the operability of the device on the wired or wireless network. For example, processing subsystems 122 allow for initiating and maintaining communications, and exchanging data, with other networked devices. For example, processor 120 may additionally include one or a combination of processing subsystems 122, such as, but not limited to: sound, non-volatile memory, file system, transmit, receive, searcher, layer 1, layer 2, layer 3, main control, remote procedure, digital signal processor, Bluetooth® system, Bluetooth®, user interface, security, authentication, graphics, USB, multimedia such as MPEG, GPRS, etc (all of which are not individually depicted in FIG. 2 for the sake of clarity).

Secure computing platform 110 additionally includes communications module 170 embodied in hardware, firmware, software, and combinations thereof, that enables communications among the various components of the web-enabled device 100, as well as between the web-enabled device 100 and the network. In described embodiments, the communications module 170 enables the communication of all correspondence between web-enabled device 100 and other wired or wireless devices. Thus, communications module 170, in some embodiments includes the requisite hardware, firmware, software and/or combinations thereof for establishing a wired or wireless network communication connection.

As previously noted in regards to FIG. 1, the memory 130 of secure computing platform 110 includes financial institution service application 140. The financial institution service application 140 is configured for establishing a secure connection with the financial institution server 200 to deliver authentication information to the financial institution server 200 and to receive account information from the financial institution server 200. The financial institution service application 140 is configured with code and is specifically configured for the web-enabled device platform on which it is implemented. For example, in an embodiment where the web-enabled device 100 is a gaming console or any other device that communicates with a signed application certificate, bi-directional application and financial institution server authentication are conducted by exchanging digital certificates between the application and the financial institution server. In addition to exchange of the digital certificates, further authentication of the web-enabled device 100 is provided by communicating a web-enabled device identifier 180 that is stored in memory 130 and accessible by API 160 for communication to the financial institution server 200 via communications module 170. The web-enabled device identifier 180 is communicated as plaintext or, in certain embodiments, the web-enabled device identifier 180 is encrypted or otherwise encoded prior to communication to prevent the identifier from being intercepted during communication.

In addition, the financial institution service application 140 can deliver user interfaces for the financial institution service that are unique to the web-enabled device platform. The user interfaces may provide for the user/customer to conduct transactions and the like using input mechanisms that are unique to the particular web-enabled device being used. For example, a game pad or gaming controller provides for multiple action buttons as opposed to the two buttons configured on a conventional mouse input device for a PC. In addition, the user interface may rely on motion detection in the game controller for inputs to the user interface, or other user inputs related to special purpose controllers or the like. In this regard, the overall user experience with the financial institution service is enhanced by providing more interactivity and the like than would be provided by a conventional PC platform.

According to one embodiment of the present invention, the memory 120 includes a user authentication module 142 that is configured to provide user authentication prior to granting the user authorization to access account information. The user authentication module 142 may include a gaming console-specific user authentication routine 144 configured to provide user authentication based on pre-determined user designated inputs to input mechanisms 190 that are specific to the web-enabled device 100.

For example, certain remote controls and game controllers include an accelerometer or other mechanisms for detecting motion in the input mechanism. As such, the user may designate a certain predetermined remote control passcode ("RCP") 146 for purposes of authentication. In some embodiments, the RCP is also a series of keystrokes or button presses such as, for example, (button A, button C, button B). The RCP, in some embodiments, includes a motion input corresponding to a plurality of vectors, for example three-dimensional vectors representing x, y and z coordinates, and a vector representing time. Once the motion input is received, the vectors may be converted to a numeric value, encrypted into a password and, optionally, hashed, prior to communicating the password to a network entity for authentication purposes. Such motions would characteristically be harder to intercept or replicate and would be easier for the user to remember than conventional alpha-numeric passwords.

In another example, the input mechanism 190 is a conventional gamepad, also referred to in the art as a joypad. The gamepad can have anywhere from two input buttons/keypads up to a dozen or more, combined with multiple omnidirectional analogue or digital control sticks. In such input devices, the user may designate a predetermined PIN 148, which, in various embodiments, is a series or pattern of multiple inputs to the various buttons, control sticks and the like configured on the remote control, gamepad, or other entry device. In some embodiments, the PIN is an alphanumeric chain of characters such as a four-digit numeric code. In other embodiments, the PIN 148 is or includes an RCP as discussed in further detail below.

In another example, the input mechanism 190 is a special purpose game controller, such as a dance pad or other mechanism that provides for inputs based on feet movement to designated areas on the pad. In such input mechanisms, the user designated predetermined PIN 148 includes a series or pattern of multiple inputs to the various areas on the pad (e.g., a dance step or routine). In another example, the input mechanism is any other special purpose input device, such as a steering wheel or a light gun, and the user designated predetermined PIN 148 is a series or pattern of one or more inputs to the specific special purpose input device. According to one embodiment of the invention, user authentication routine 144 is configured to store and accept a different user input/action for each input mechanism, such that the user can provide the predetermined input/motion to the device, depending upon which device or devices are currently connected to the web-enabled device 100.

In another example, the input mechanism 190 is a touchscreen or the like and the user designated predetermined PIN 148 includes a series or pattern of various inputs to the touch screen display, such as movement of objects on the display or a series/pattern of taps to the display.

Referring now to FIG. 3, a flow diagram illustrates a method 300 for authenticating a customer with a financial institution server 200 and communicating account information to the customer using a web-enabled device 100, in accordance with one embodiment of the present invention. At step 310, a financial institution service application 140 is loaded onto a web-enabled device 100. The financial institution service application 140, in some embodiments, is obtained from the financial institution in a tangible form, such as Compact Disc (CD) or the like, loaded onto the web-enabled device 100 by inserting the CD in a portable media drive and saving the application in device memory 130. In alternate embodiments, the financial institution service application 140 is downloaded from a financial institution networked site, such as a public website or the like and stored on the web-enabled device's memory 130. As previously mentioned, the financial institution service application 140, in some embodiments, is associated with one or more financial institutions such as a commercial bank, brokerage firm, lending firm or the like. The financial institution service application 140 provides for establishing a secured network connection to the associated financial institution for delivery of authentication information, verification of authentication, and communication of account information. As indicated above, the account information, in various embodiments includes, but is not limited to, account current and available balances, transaction information such as information regarding pending transaction and scheduled future transactions, information concerning posted transactions such as date, transaction type, check number if applicable, description of transaction, and debit or credit amount, customer information such as contact address, phone and e-mail and other information related to the customer's one or more accounts maintained by the financial institution, and the like.

At step 320, the financial institution service application 140 is launched on the web-enabled device 100. An indication for launching the financial institution service application 140 in some embodiments is based on user input to an input mechanism 190, such as a remote control, game controller or the like. In other embodiments, the financial institution service application 140 is configured for launching at or proximate the boot-up/power-up of the web-enabled device 100.

At step 330, the financial institution service application 140 establishes a connection with the financial institution server 200. In some embodiments, the connection is secured using bi-directional digital certificate exchange between the application 140 and the financial institution server 200. In addition to digital certificate exchange for the purpose of verifying both the application 140 at the financial institution server 200 and the financial institution server 200 at the application 140, the web-enabled device 100, in some embodiments, is configured to communicate a hardware identifier to the financial institution server 200 for the purpose of verifying the web-enabled device 100 at the financial institution server 200 as briefly discussed above regarding the web-enabled device identifier 180.

In some embodiments, the connection between the web-enabled device 100 and the financial institution server 200 is secured by encrypting the communications between the two. In various embodiments, different encryption routines are used, and in those various embodiments, the encryption routine may be a secret/private key encryption routine, such as a block cipher routine, implementing an XOR function or a more detailed secret key encryption algorithm, such as Data Encryption Standard (DES), Triple-DES (3DES), DESX, Advanced Encryption Standard (AES), CAST-128, CAST-256, International Data Encryption Algorithm (IDEA), Rivest Ciphers 1-6 (RC1-RC-6), Blowfish, Twofish, Camellia, MISTY1, Secure And Fast Encryption Routine (SAFER), KASUMI, SEED, Skipjack or any other suitable private key encryption routine. Additionally, a public key encryption routine may be used in some embodiments to encrypt the numeric value in the authentication process. The public key encryption routine may be, but is not limited to, RSA, Diffie-Hellman, Digital Signature Algorithm (DSA), ElGamel, Elliptical Curve Crptography (ECC), Public-Key Crytography Standards (PKCS), Cramer-Shoup, Key Exchange Algorithm (KEA), LUC or the like. In some embodiments, the user's password discussed below is hashed prior to communication to a network entity to provide for further security. The hash function is applied to ensure that the password is not intercepted during communication and serves as a digital fingerprint to ensure that the password has not been altered by an intruder or virus.

At step 340, once the network connection has been established, the user is authenticated as a means of authorizing the user to receive, and in some embodiments edit, the account information. User authentication allows the user to provide authentication credentials, generally in the form of a password or passcode, which are securely validated by the financial institution. According to one embodiment of the invention, the user authentication credentials are defined by web-enabled device-specific user inputs, such as a predetermined set of keystrokes provided on the input mechanism 190 such as a remote control or gamepad. In some embodiments of the web-enabled device 100, motion provided to a motion-detecting input mechanism 190 or other predetermined inputs provided to a joypad or any other special purpose input mechanism 190.

In different embodiments of the invention, various authentication methods and systems are used. For example, in one embodiment, a configuration of the SiteKey® system is used. SiteKey® is a web-based security system that provides one type of mutual authentication between users and websites or institution servers such as the financial institution server 200.

The SiteKey® system had been owned by RSA Data Security, which is the security division of EMC Corporation, and is headquartered in Bedford, Mass., but the SiteKey® registered trademark is owned by Bank of America Corporation of Charlotte, N.C., the assignee of the present invention. The first step in SiteKey® authentication is the user identifies him or herself to the authenticating entity, which is, in this case, the financial institution server 200. The user's identity, in most embodiments, takes the form of a username or alias. If the authenticating entity determines a valid username or alias has been entered by the user, then the process proceeds. If not, the user is either asked to enter the username again or is blocked from entering additional usernames. The next step involves the authenticating entity authenticating itself to the user. This is typically accomplished by the authenticating entity displaying an image and/or an accompanying phrase that was previously chosen by the user and stored by the authenticating entity. If the user does not recognize the image and/or an accompanying phrase, the user should assume the entity in communication is not the actual account provider, but rather, a phishing website or other nefarious entity. As such, should the user not recognize the image and/or the accompanying phrase, the user should immediately abandon the interaction without entering any additional information. If the user does recognize the image and/or the accompanying phrase, the user may deem the entity authentic and proceed. Typically, the next step is for the user to enter a password that is associated with the previously entered username. If the password does not match the username entered, the authenticating entity, in some embodiments, begins the entire process again, and in others, prevents additional tries to authenticate. If the password matches the entered username, the authenticating entity validates the user and confirms the user's validation by communicating the validation to the web-enabled device 100.

Accordingly, at step 350, based on the authentication process, the web-enabled device 100 receives confirmation of the validation of the user authorization and, in some embodiments, communicates the successful authentication to the user through the display device 105. Once validation of authentication has been received at the web-enabled device 100, the web-enabled device 100 creates a PIN 148 associated with the user (step 360). In other embodiments, the financial institution server 200 creates the PIN and communicates the PIN to the web-enabled device 100, and in yet other embodiments, the web-enabled device 100 allows the user to choose an appropriate PIN and the device 100 receives the user's input regarding PIN using the input mechanism 190. In some of those embodiments, the user is asked to enter the PIN more than once to ensure that the captured PIN corresponds with the user's intended PIN. Once the web-enabled device 100 is satisfied with the user's PIN entry or the PIN has been created, the PIN is locally stored (step 370). This stored PIN is referred to herein as an "initial PIN." Similarly, in embodiments where an RCP is created or input by a user, the RCP is referred to herein as an "initial RCP." In other embodiments, the PIN is locally stored along with the authentication information provided by the user such as the username and password, and in others only the authentication information is locally stored. In most embodiments, the authentication information and/or the PIN are locally stored in the memory 130 in a local user profile 150 associated with one or more users. For example, in one embodiment, after the user has been authenticated using the SiteKey® system discussed above including entering a username and an associated password, the user is prompted to enter a PIN twice. After the PIN has been accepted, the web-enabled device 100 stores both the PIN and the authentication information including the username and password in a local user profile associated with the user. In addition, in some embodiments, the validation received from the financial institution server 200 (see step 350) is stored along with the authentication information in the local user profile 150 of the memory 130.

At step 380, the user conducts one or more account information transactions. For example, in one embodiment, the user chooses an "accounts" tab displayed in conjunction with the financial institution service application 140 running on the web-enabled device 100 and visualized on the display device 105. Once the user has chosen the accounts tab, the user's account summaries are displayed, for example checking, savings, investment, and credit card account identification and balance information is displayed. The user can then choose a particular account to retrieve additional related account information. For example, the user can choose a particular checking account or savings account and thereafter choose one or more pieces of account information for additional, more detailed information. In one embodiment, the application 140 displays a listing of cleared and/or pending transactions with interactive transaction information such as clickable (selectable) transaction identifiers, which when chosen, retrieve additional information concerning a particular transaction. For example, if the user chooses a check deposit, choosing the application, in one embodiment, provides a hyperlink leading to an image of the deposited check. In other embodiments, various other pieces of account information and transaction information are displayed, such as, for example, transaction amount, data and type of transaction.

In another embodiment, conducting transactions is based on inputs from accessories/devices/applications, which are in communication with the web-enabled device 100. The accessories may include, but are not limited to, a card scanner, a cash drawer, a UPC scanner or the like. In this regard, the business user can use the web-enabled device 100 as a point-of-sale terminal enabling cash services via the web-enabled device 100 and/or back-end financial transactions conducted by the financial institution via the secure session established between the application and financial institution server(s).

Generally, steps 330 through 350 and 370, and in various embodiments other method steps, are termed "primary authentication" for the user. In some embodiments, the user retains this primary authentication (that is, authentication requiring validation from the financial institution server) for a predetermined, finite period of time. In such a configuration, the user will not be required to re-enter authentication information such as a password for a predetermined period of time. Rather, once method 300 has been executed, including receiving validation of the authentication from the financial institution (see step 350) and locally storing the user's authentication information in a user profile (see step 370), the user will not need to re-enter authentication information for a predetermined period of time. The predetermined period of time being, for example, a day, a few days, one week, two weeks, one month, or some other predetermined period of time set as a constant or variable and stored within the financial institution service application 140 and the financial institution account module 240. The user, for example, once authenticated via method 300, can efficiently access account information using the financial institution service application 140 running on the web-enabled device 100. In some embodiments, however, the user will be required to provide "secondary authentication," that is, validation of the user's identity, before accessing account information in addition to the primary authentication of process 300. In some embodiments, as discussed below in detail with reference to FIGS. 4 and 5, such secondary authentication typically involves inputting a predetermined PIN or RCP (see steps 360 and 370 for creating and storing the PIN). Once the PIN or RCP is authenticated or validation of authentication is received at the device 100 (see step 430 for local authentication of FIG. 4, step 540 for remote authentication, and step 550 for receiving validation of FIG. 5), the user, via the web-enabled device, can access account information. In other embodiments, discussed below with reference to FIG. 6, the user's secondary authentication is processed automatically, that is, without requiring action by the user such as the need to enter a PIN, by use of a pre-approved personal mobile device in wireless communication with the web-enabled device.

Referring now to FIG. 4, a method is illustrated for providing secondary authentication or re-authenticating the customer using retained authentication information stored in one or more user profiles according to one embodiment of the present invention. At step 410, user authentication information is retrieved from one or more user profiles 150 stored locally in the memory 130. Step 410 is initiated when the user prompts the web-enabled device 100 to provide account information. For example, in one embodiment, the user chooses a widget or application running in the background of the display 105 using the input mechanism 190. The user provides "identity information," which is information tending to identify the user. Examples of identity information include, but are not limited to the user's actual name, a username associated with the user, a PIN and/or a RCP. The PIN and/or RCP received from the user during this secondary authentication process is referred to herein as a "current PIN" and/or a "current RCP." The current PIN/current RCP is the user's input when the user is prompted by the system for the user's PIN/RCP, which was created/input to the system and stored during method 300. As discussed above, the PIN/RCP stored in the system is referred to as the "initial PIN" and/or "initial RCP," and is typically identical to the current PIN/ current RCP input by the user unless the user incorrectly enters his or her PIN or in the case where the user is someone without access to the account. The user's identity information is received by the input mechanism 190 (step 420), and the web-enabled device 100 authenticates the received identity information "locally" thereby verifying the identity of the user (step 430). "Locally" refers to using the processor 120 without communicating the authentication information across the Internet 20 to the financial institution server 200 for authentication. At step 440, if the user is authenticated, the web-enabled device 100 communicates the validation of the user authentication to the financial institution server 200. As such, the financial institution server 200 becomes aware that the user has been authenticated for an account information communication session, and at step 450 the web-enabled device 100 facilitates the user conducting one or more account information transactions such as those discussed at length above.

Referring now to FIG. 5, a method is illustrated for providing secondary authentication or re-authenticating the customer using retained authentication information stored in one or more user profiles according to another embodiment of the present invention. At step 510, the user authentication information is retrieved from one or more user profiles associated with the user. Step 510 is initiated upon prompting by the user to access account information. As discussed above with reference to FIG. 4, the financial institution service application 140 is typically running in the background of other actively displayed content on the display 105. However, the user can choose the application or "maximize" the application for interaction with the application 140 as desired. Once the user indicates to the web-enabled device 100 the user's identification information, the web-enabled device 100 receives the identification information (step 520) and communicates the authentication information to the financial institution server 200 (step 530). In some embodiments, the authentication information communicated to the financial institution server 200 includes the identification information and in other embodiments it does not. In some embodiments, the financial institution server 200 re-authenticates the user by verifying the identity of the user using the latest authentication information provided by the user (step 540). Next, validation of the user authentication is received from the financial institution server 200 (step 550). Finally, once the user is authenticated, one or more account information transactions are conducted (step 560).

The method 500 illustrated in FIG. 5 is an alternative method to the method 400 illustrated in FIG. 4. Method 400 involves local authentication of the user at the web-enabled device based on minimal user input such as a username, PIN, and/or RCP, which are compared to authentication information stored in one or more local user profiles 150 stored in the local memory 130. Accordingly, communication with the financial institution server 200 need not occur until validation of the authentication is sent from the web-enabled device 100 to the financial institution server 200. On the other hand, method 500 involves "remote" authentication of the user at the financial institution server 200. "Remote" refers to a process or processes occurring at a location separate and independent from the web-enabled device. Method 500 is also based on minimal user identity information input such as a username, PIN, and/or RCP; however, method 500 involves communicating the user's authentication information from the web-enabled device 100 to the financial institution server 200. In various other embodiments, a combination of the local authentication of method 400 and the remote authentication of method 500 are used. For example, in one embodiment, the user's PIN is authenticated locally, but the username and password retrieved from the user profile is communicated to the server 200 for additional authentication. Another example, in another embodiment involves local PIN authentication in addition to remote PIN authentication.

Referring now to FIG. 6, a diagram illustrating various alternate embodiments of a system 600 in accordance with the invention is shown. The web-enabled device 100 communicates over the Internet 20 with the financial institution server 200 as described in detail above. The web-enabled device 100 is typically connected to a display 105 or includes an integrated display, such as an embodiment having a web-enabled television. Also, as discussed above, a user 605 can input authentication and/or identification information such as a PIN, RCP or other information such as information indicating a choice associated with the application's graphical user interface to the web-enabled device 100 using an input mechanism 190 such as a remote control or a gaming controller.

In another embodiment, the web-enabled device 100 is configured for communicating wirelessly with one or more personal mobile devices 610 such as, but not limited to, a tablet computer 610A, a personal digital assistant (PDA) 610B, a cellular phone 610C, or a smart phone 610D. The user 605, in one embodiment, carries with him or her a mobile device 610 that includes a mobile device identifier stored thereon. The mobile device identifier is saved in the memory 130 of the web-enabled device 100 such that the mobile device 610, when in wireless communication with the web-enabled device 100, communicates its mobile device identifier to the web-enabled device 100 for identification. The process, in some embodiments, substitutes for the secondary authentication processes discussed above. In another embodiment, the mobile device 610 is used as the input mechanism 190 such that the user 605 enters the PIN and/or RCP using the mobile device 610. In yet other embodiment, the mobile device communicates its mobile device identifier to the web-enabled device 100 as well as receiving input from the user regarding the PIN and/or RCP. In this regard, the secondary authentication includes two layers of authentication. These embodiments, particularly the first embodiment discussed wherein the proximity of the mobile device 610 with the web-enabled device 100, provide a great level of convenience for the user 605. For example, in one embodiment, the user 605 has previously performed the primary authentication and his mobile device's identifier has been stored on the web-enabled device 100. In order to access account information, the user 605 only needs to move within wireless communication range of the web-enabled device for secondary authentication to take place. For a predetermined period of time thereafter, the user 605 can use the application 140 to access account information.

In another embodiment of the system 600, the user 605 is operating a vehicle having a web-enabled display 650. In some embodiments, the vehicle web-enabled display 650 also provides a wireless hotspot for connecting one or more mobile wireless devices to the Internet through the vehicle's Internet connection. In certain embodiments, the vehicle web-enabled display 650 is the web-enabled device 100 of the present invention. As such, the vehicle web-enabled display 650 performs the functions and applicable process steps discussed above from methods 300, 400, and 500. In some such embodiments, the input mechanism 190 is a touch screen or other input device such as a touchpad or keypad disposed within the vehicle and wired to or wirelessly connected with the vehicle web-enabled display 650. Furthermore, in some embodiments, secondary authentication is performed using a mobile device 610 as discussed above with regard to FIG. 6.

In accordance with some embodiments, the web-enabled device 100 is a secure device that executes signed code only, the web-enabled device 100 implements a cryptography engine to perform common cryptographic functions, such as encryption, decryption, authentication, digital signing, hashing, and the like. The cryptography engine may be implemented as part of the CPU 120, or in software stored on a hard disk drive (not shown) or memory 130 that executes on the CPU 120, so that the CPU 120 is configured to perform the requisite cryptographic functions.

The web-enabled device 100, in some embodiments is operated as a stand-alone system by simply connecting the system to a television or other display 105. In a stand-alone mode, the web-enabled device 100 allows one or more users to watch multimedia content, play games, or listen to music. However, with the integration of broadband connectivity made available through the communications module 170, the web-enabled device 100 may further be operated as a participant in a larger network multimedia sharing community, social networking community, gaming community and/or be connected to other networked entities.

Thus, present embodiments provide for systems, methods, and computer program products for authenticating and efficiently re-authenticating a user with a financial institution in order to gain access to account information using a web-enabled device. The web-enabled device stores user profiles associated with the user including authentication information provided by the user during primary authentication. The device retrieves the authentication information upon secondary authentication, that is, validation of the user's identity, which in some embodiments, includes local validation of a personal identification number ("PIN") and/or a remote control passcode ("RCP"). As such, the web-enabled device re-authenticates the user without requiring authentication communication with a financial institution server, and thereafter, the user interacts with an application running on the web-enabled device to retrieve desired account information from the financial institution server.

As will be appreciated by one of ordinary skill in the art in view of this disclosure, the present invention may be embodied as an apparatus (including, for example, a system, machine, device, computer program product, and/or the like), as a method (including, for example, a business process, computer-implemented process, and/or the like), or as any combination of the foregoing. Accordingly, embodiments of the present invention may take the form of an entirely software embodiment (including firmware, resident software, micro-code, etc.), an entirely hardware embodiment, or an embodiment combining software and hardware aspects that may generally be referred to herein as a "system." Similarly, embodiments of the present invention may also include components or elements referred to herein as "modules." Modules may take the form of an entirely hardware embodiment or an embodiment combining software and hardware aspects. Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, etc.) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator- and/or human-implemented steps in order to carry out an embodiment of the present invention.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention, unless the context clearly indicates otherwise. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, combinations, and modifications of the just described embodiments can be configured without departing from the scope and spirit of the invention. Therefore, it is to be understood that, within the scope of the appended claims, the invention may be practiced other than as specifically described herein.

What is claimed is:

1. A method for providing efficient authentication of a user desiring access to account information maintained by a financial institution, the method comprising:

determining a time of validation of primary authentication;
   receiving a user request for access to account information using the primary authentication;
   determining whether a predetermined period of time has lapsed since the time of validation of primary authentication;
   in response to determining that the predetermined period of time has lapsed since the time of validation of primary authentication, prompting the user for new user authentication information;
   receiving, via a web-enabled device associated with the user, the new user authentication information from the user;
   communicating, from the web-enabled device, the new user authentication information to a financial institution server;
   receiving, at the web-enabled device, validation of the new primary authentication from the financial institution server; and
   in response to receiving the validation of the new primary authentication from the financial institution server, storing, at the web-enabled device, the new user authentication information in one or more user profiles associated with the user;
   in response to receiving the validation of the new primary authentication from the financial institution server:
       receiving a personal identification number (PIN) from the user;
       receiving a mobile device identifier associated with a mobile device of the user, wherein the mobile device is configured to wirelessly communicate with the web-enabled device; and
       storing, at the web-enabled device, the PIN received from the user and the mobile device identifier;
   retrieving the new user authentication information including verification of previously validated new primary authentication from the one or more user profiles stored on the web-enabled device when the user desires access to the account information within the predetermined period of time from the validation of the new primary authentication;
   verifying, at the web-enabled device, the identity of the user, thereby establishing secondary authentication at the web-enabled device by verifying the identity of the user without accessing the financial institution server, when the user desires access to the account information within the predetermined period of time from the validation of the new primary authentication, wherein establishing the secondary authentication further comprises:
- establishing a wireless communication link comprising a predetermined communication range, between the web-enabled device and the mobile device;
- retrieving, by the web-enabled device via the wireless communication link, the mobile device identifier from the mobile device;
- receiving, at the web-enabled device via the wireless communication link, the PIN provided by the user via the mobile device; and
- establishing the secondary authentication based on the successful validation of at least the mobile device identifier and the PIN;

connecting the web-enabled device to the financial institution server, in response to establishing the secondary authentication; and conducting, using the web-enabled device, one or more account information transactions with the financial institution server, in response to establishing the secondary authentication.

2. The method of claim 1 further comprising:
creating an initial personal identification number (PIN) associated with the user, in response to receiving the validation of the new primary authentication from the financial institution server;
receiving the PIN from the user at the web-enabled device, comprising a confirmation of the created initial PIN;
storing the initial PIN in the one or more user profiles associated with the user stored on the web-enabled device;
retrieving the initial PIN from the one or more user profiles; and
wherein verifying the identity of the user comprises:
- receiving the PIN input from the user; and
- verifying the PIN input matches the initial PIN retrieved from the one or more user profiles.

3. The method of claim 1 further comprising:
storing the initial PIN in the one or more user profiles associated with the user stored on the web-enabled device, in response to receiving the validation of the new primary authentication from the financial institution server;
retrieving the initial PIN from the one or more user profiles; and
wherein verifying the identity of the user comprises:
- receiving the PIN input from the user; and
- verifying the PIN input matches the initial PIN retrieved from the one or more user profiles.

4. The method of claim 2 further comprising:
communicating validation of the secondary authentication to the financial institution server.

5. The method of claim 3 further comprising:
communicating validation of the secondary authentication to the financial institution server.

6. The method of claim 1 further comprising:
determining whether a predetermined period of time has lapsed since primary authentication; and
communicating that the predetermined period of time has elapsed to the user.

7. The method of claim 1, wherein verifying the identity of the user comprises:
receiving, from the mobile device, identity information identifying the user to the web-enabled device; and
validating the identity information thereby establishing secondary authentication.

8. The method of claim 7, wherein the identity information comprises one or more of the name of the user, a username, mobile device identifier, a current personal identification number, and a current remote control passcode.

9. A system for providing efficient authentication of a user desiring access to account information maintained by a financial institution, the system comprising:
a web-enabled device configured for connecting to a financial institution server, the web-enabled device including a processor operatively connected to a memory device and a communications module;
a module stored in the memory device comprising computer readable instructions, that when executed by the processor are configured to cause the processor to:
- determine a time of validation of primary authentication;
- receive a user request for access to account information using the primary authentication;
- determine whether a predetermined period of time has lapsed since the time of validation of primary authentication;
- in response to determining that the predetermined period of time has lapsed since the time of validation of primary authentication, prompt the user for new user authentication information;
- receive, via the web-enabled device associated with the user, the new user authentication information from the user;
- communicate, from the web-enabled device, the new user authentication information to the financial institution server;
- receive, at the web-enabled device, validation of the new primary authentication from the financial institution server; and
in response to receiving the validation of the new primary authentication from the financial institution server, store, at the web-enabled device, the new user authentication information in one or more user profiles associated with the user;
in response to receiving the validation of the new primary authentication from the financial institution server:
- receive a personal identification number (PIN) from the user;
- receive a mobile device identifier associated with a mobile device of the user, wherein the mobile device is configured to wirelessly communicate with the web-enabled device; and
- store, at the web-enabled device, the PIN received from the user and the mobile device identifier;
retrieve the new user authentication information including verification of previously validated new primary authentication from the one or more user profiles stored on the web-enabled device when the user desires access to the account information within the predetermined period of time from the validation of the new primary authentication;
verify, at the web-enabled device, the identity of the user, thereby establishing secondary authentication at the web-enabled device by verifying the identity of the user without accessing the financial institution server, when the user desires access to the account information within the predetermined period of time from the validation of the new primary authentication, wherein establishing the secondary authentication further comprises:
  establishing a wireless communication link comprising a predetermined communication range, between the web-enabled device and the mobile device;
  retrieving, by the web-enabled device via the wireless communication link, the mobile device identifier from the mobile device;
  receiving, at the web-enabled device via the wireless communication link, the PIN provided by the user via the mobile device; and
  establishing the secondary authentication based on the successful validation of at least the mobile device identifier and the PIN;
connect the web-enabled device to the financial institution server, in response to establishing the secondary authentication; and
conduct, using the web-enabled device, one or more account information transactions with the financial institution server, in response to establishing the secondary authentication.

10. The system of claim 9, wherein the module further comprises instructions that are configured to cause the processor to:
  create an initial personal identification number (PIN) associated with the user, in response to receiving the validation of the new primary authentication from the financial institution server;
  receive the PIN from the user at the web-enabled device, comprising a confirmation of the created initial PIN;
  store the initial PIN in the one or more user profiles associated with the user stored on the web-enabled device;
  retrieve the initial PIN from the one or more user profiles; and
  wherein verifying the identity of the user comprises:
    receiving the PIN input from the user; and
    verifying the PIN input matches the initial PIN retrieved from the one or more user profiles.

11. The system of claim 9, wherein the module further comprises instructions that are configured to cause the processor to:
  store the initial PIN in the one or more user profiles associated with the user stored on the web-enabled device, in response to receiving the validation of the new primary authentication from the financial institution server;
  retrieve the initial PIN from the one or more user profiles; and
  wherein verifying the identity of the user comprises:
    receiving the PIN input from the user; and
    verifying the PIN input matches the initial PIN retrieved from the one or more user profiles.

12. The system of claim 10, wherein the module further comprises instructions that are configured to cause the processor to:
  communicate validation of the secondary authentication to the financial institution server.

13. The system of claim 11, wherein the module further comprises instructions that are configured to cause the processor to:
  communicate validation of the secondary authentication to the financial institution server.

14. The system of claim 9, wherein the module further comprises instructions that are configured to cause the processor to:
  determine whether a predetermined period of time has lapsed since primary authentication; and
  communicate that the predetermined period of time has elapsed to the user.

15. The system of claim 9, wherein the module further comprises instructions that are configured to cause the processor to:
  receive, from the mobile device, identity information identifying the user to the web-enabled device; and
  validate the identity information thereby establish secondary authentication.

16. The system of claim 15, wherein the identity information comprises one or more of the name of the user, a username, mobile device identifier, a current personal identification number, and a current remote control passcode.

17. A computer program product for providing efficient authentication of a user desiring access to account information maintained by a financial institution, comprising a non-transitory computer-readable storage medium having computer-readable instructions that when executed by a processor are configured to cause the processor to:
  determine a time of validation of primary authentication;
  receive a user request for access to account information using the primary authentication;
  determine whether a predetermined period of time has lapsed since the time of validation of primary authentication;
  in response to determining that the predetermined period of time has lapsed since the time of validation of primary authentication, prompt the user for new user authentication information;
  receive, via a web-enabled device associated with the user, the new user authentication information from the user;
  communicate, from the web-enabled device, the new user authentication information to a financial institution server;
  receive, at the web-enabled device, validation of the new primary authentication from the financial institution server; and
  in response to receiving the validation of the new primary authentication from the financial institution server, store, at the web-enabled device, the new user authentication information in one or more user profiles associated with the user;
  in response to receiving the validation of the new primary authentication from the financial institution server:
    receive a personal identification number (PIN) from the user;
    receive a mobile device identifier associated with a mobile device of the user, wherein the mobile device is configured to wirelessly communicate with the web-enabled device; and
    store, at the web-enabled device, the PIN received from the user and the mobile device identifier;
  retrieve the new user authentication information including verification of previously validated new primary authentication from the one or more user profiles stored on the web-enabled device when the user desires access to the account information within the predetermined period of time from the validation of the new primary authentication;
  verify, at the web-enabled device, the identity of the user, thereby establishing secondary authentication at the web-enabled device by verifying the identity of the user without accessing the financial institution server, when the user desires access to the account information within the predetermined period of time from the validation of the new primary authentication, wherein establishing the secondary authentication further comprises:
  establishing a wireless communication link comprising a predetermined communication range, between the web-enabled device and the mobile device;
  retrieving, by the web-enabled device via the wireless communication link, the mobile device identifier from the mobile device;
  receiving, at the web-enabled device via the wireless communication link, the PIN provided by the user via the mobile device; and
  establishing the secondary authentication based on the successful validation of at least the mobile device identifier and the PIN;
connect the web-enabled device to the financial institution server, in response to establishing the secondary authentication; and
conduct, using the web-enabled device, one or more account information transactions with the financial institution server, in response to establishing the secondary authentication.

18. The computer program product of claim 17, wherein the non-transitory computer-readable storage medium further comprises computer-readable instructions that when executed by the processor are configured to cause the processor to:
  create an initial personal identification number (PIN) associated with the user, in response to receiving the validation of the new primary authentication from the financial institution server;
  receive the PIN from the user at the web-enabled device, comprising a confirmation of the created initial PIN;
  store the initial PIN in the one or more user profiles associated with the user stored on the web-enabled device;
  retrieve the initial PIN from the one or more user profiles; and
  wherein verifying the identity of the user comprises:
    receiving the PIN input from the user; and
    verifying the PIN input matches the initial PIN retrieved from the one or more user profiles.

19. The computer program product of claim 17, wherein the non-transitory computer-readable storage medium further comprises computer-readable instructions that when executed by the processor are configured to cause the processor to:
  store the initial PIN in the one or more user profiles associated with the user stored on the web-enabled device, in response to receiving the validation of the new primary authentication from the financial institution server;
  retrieve the initial PIN from the one or more user profiles; and
  wherein verifying the identity of the user comprises:
    receiving the PIN input from the user; and
    verifying the PIN input matches the initial PIN retrieved from the one or more user profiles.

20. The computer program product of claim 18, wherein the non-transitory computer-readable storage medium further comprises computer-readable instructions that when executed by the processor are configured to cause the processor to:
  communicate validation of the secondary authentication to the financial institution server.

21. The computer program product of claim 19, wherein the non-transitory computer-readable storage medium further comprises computer-readable instructions that when executed by the processor are configured to cause the processor to:
  communicate validation of the secondary authentication to the financial institution server.

22. The computer program product of claim 17, wherein the non-transitory computer-readable storage medium further comprises computer-readable instructions that when executed by the processor are configured to cause the processor to:
  determine whether a predetermined period of time has lapsed since primary authentication; and
  communicate that the predetermined period of time has elapsed to the user.

23. The computer program product of claim 17, wherein the non-transitory computer-readable storage medium further comprises computer-readable instructions that when executed by the processor are configured to cause the processor to:
  receive, from the mobile device, identity information identifying the user to the web-enabled device; and
  validate the identity information thereby establish secondary authentication.

24. The computer program product of claim 23, wherein the identity information comprises one or more of the name of the user, a username, mobile device identifier, a current personal identification number, and a current remote control passcode.

* * * * *